United States Patent [19]
Earley, Jr.

[11] Patent Number: 5,159,803
[45] Date of Patent: Nov. 3, 1992

[54] EDGING AND TRIMMING MECHANISM FOR USE WITH A POWER LAWN MOWER

[76] Inventor: Gilbert E. Earley, Jr., 96 Opossum Lake Rd., Carlisle, Pa. 17013

[21] Appl. No.: 708,882

[22] Filed: May 31, 1991

[51] Int. Cl.⁵ .................................................. A01D 35/00
[52] U.S. Cl. ...................................... 56/12.7; 56/16.7
[58] Field of Search ................... 56/12.7, 12.8, 13.5, 56/13.6, 16.7, 16.9

[56] References Cited

U.S. PATENT DOCUMENTS

| | | |
|---|---|---|
| 4,182,100 | 1/1980 | Letter . |
| 4,379,385 | 4/1983 | Reinhall . |
| 4,411,125 | 10/1983 | Strickland . |
| 4,466,235 | 8/1984 | Cole . |
| 4,703,613 | 11/1987 | Raymond ............................. 56/12.7 |
| 4,823,542 | 4/1989 | Klever et al. ..................... 56/12.7 X |
| 5,065,566 | 11/1991 | Gates .................................. 56/12.7 |

FOREIGN PATENT DOCUMENTS 2352484  12/1977  France .
951951   3/1964   United Kingdom .

*Primary Examiner*—Thuy M. Bui
*Attorney, Agent, or Firm*—Terry M. Gernstein

[57] ABSTRACT

An edging and trimming mechanism is connected to the main housing of a power lawn mower and includes a bracket arm that supports a string deploying device. The string deploying device is connected to the lawn mower engine in one form of the invention and has an electric motor in another form of the invention. The bracket can be moved to adjust the height thereof and can be moved out of the way in the second form of the invention.

4 Claims, 6 Drawing Sheets

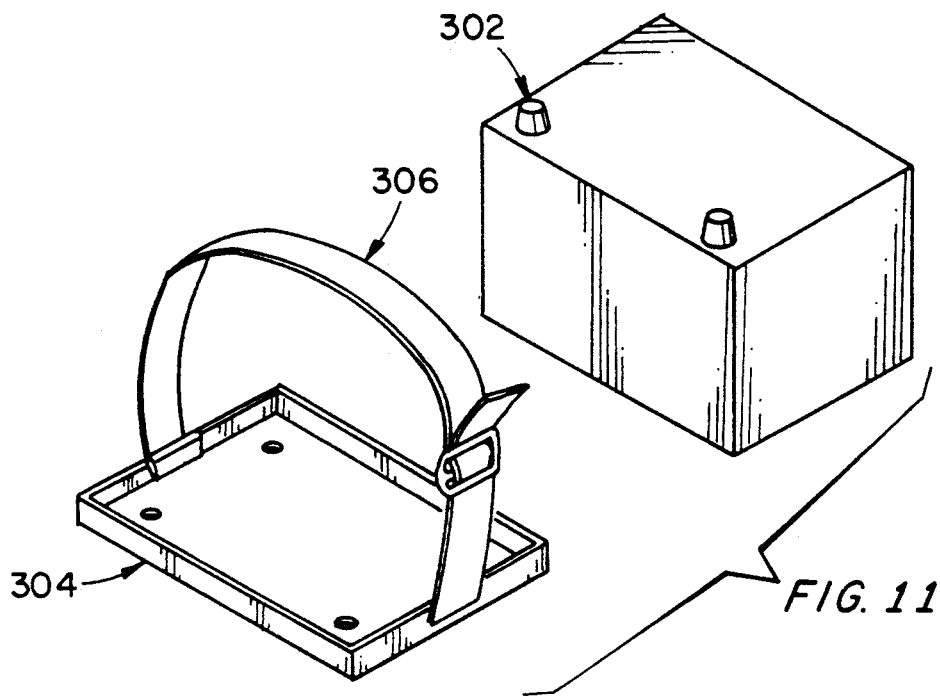
FIG. 11
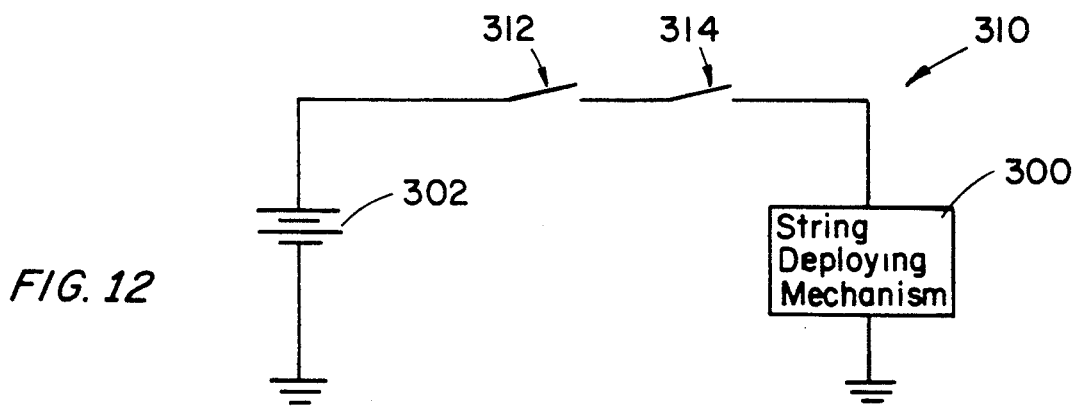
FIG. 12
FIG. 13
FIG. 14

EDGING AND TRIMMING MECHANISM FOR USE WITH A POWER LAWN MOWER

TECHNICAL FIELD OF THE INVENTION

The present invention relates to the general art of agricultural implements, and to the particular field of gardening tools and accessories.

BACKGROUND OF THE INVENTION

Many home owners have intricate landscaping on their property. This landscaping includes trees, bushes, walkways, and the like. The remaining portions of the property are often covered by grass.

Of course, grass must be trimmed from time to time. This task is usually carried out with a lawn mower of some sort. In recent times, the lawn mower is generally powered, either by an internal combustion engine or an electric motor. The lawn mower is either propelled by hand, or self propelled, and can be either a walking mower or a driving mower.

The task of cutting the grass is made more difficult due to the existence of the landscaping of many lawns. The grass must be edged and neatly trimmed adjacent to the landscaping articles and areas in order for the overall effect of the lawn to be fully appreciated. This edging and trimming has been carried out using a variety of tools. These tools have included hand tools, such as shears, or the like. Due to the use of such tools, the task of edging and trimming around landscaped areas has become onerous, and is often neglected—to the detriment of the overall appearance of the lawn.

Because of this problem, the art has included several devices to assist a user in trimming grass around and adjacent to landscaped areas or other lawn areas that may be difficult to reach with a lawnmower. One such device includes a string that is attached to a motor and is driven in a circular path. This string is automatically played out as the device is used, and cuts grass or other such growth as it passes over certain areas.

While successful, these devices require a user to complete two separate operations in order to cut the grass and edge about the landscaped areas of a lawn. This two-step operation, while having an improved efficiency, is still burdensome to many.

Accordingly, there is a need for a gardening accessory that will improve the efficiency of a lawn mowing and edging operation.

However, many lawn mowing operations do not require a concomitant edging operation. In fact, in some instances, an edger may even get in the way of an efficient lawn mowing operation. Still further, all lawns are not identical. Therefore, an edger must have the capability to be adjusted to meet the particular needs of a given situation without a great deal of trouble.

Therefore, not only is there a need to improve the efficiency of a lawn mowing and edging operation, there is also a need for providing a user with an option of moving one or more elements of the device used to perform the task out of the way.

OBJECTS OF THE INVENTION

It is a main object of the present invention is to provide a combined lawn mower and edger that is efficient and easy to use.

It is another object of the present invention to provide a combined lawn mower and edger that can be used on a variety of different lawn mowers.

It is another object of the present invention to provide a combined lawn mower and edger that can move the edger out of the way when that element of the device is not needed.

It is another object of the present invention to provide a combined lawn mower and edger in which the edger can be easily adjusted to meet the exigencies of a particular situation.

SUMMARY OF THE INVENTION

These, and other, objects are achieved by an edger unit that is attached to the motor housing of a powered lawn mower. The edger unit can be adjusted to be most efficient for a given situation and can even be moved out of the way if an edging or trimming operation is not required. The edger and trimmer includes a string deploying unit that rotates the string in a manner to cut the tops off of growth as the string moves therepast. The string is automatically deployed during operation.

In this manner, the edging and trimming operation can be carried out simultaneously with the mowing operation. However, on the other hand, the edger can be moved out of the way in the event edging is not required. Still further, the edger and trimmer can be moved into the most advantageous position if necessary, and can be moved without a great deal of difficulty.

BRIEF DESCRIPTION OF THE DRAWING FIGURES

FIG. 11 is an exploded perspective view of a battery and battery mount used in one form of the invention.

FIG. 12 is a circuit diagram of a battery-powered form of the invention.

FIG. 13 illustrates a tilt switch that can be used in the circuit shown in FIG. 12.

FIG. 14 illustrates another form of tilt switch that can be used in the FIG. 12 circuit.

DETAILED DESCRIPTION OF THE PREFERRED EMBODIMENT OF THE INVENTION

Figure 1:
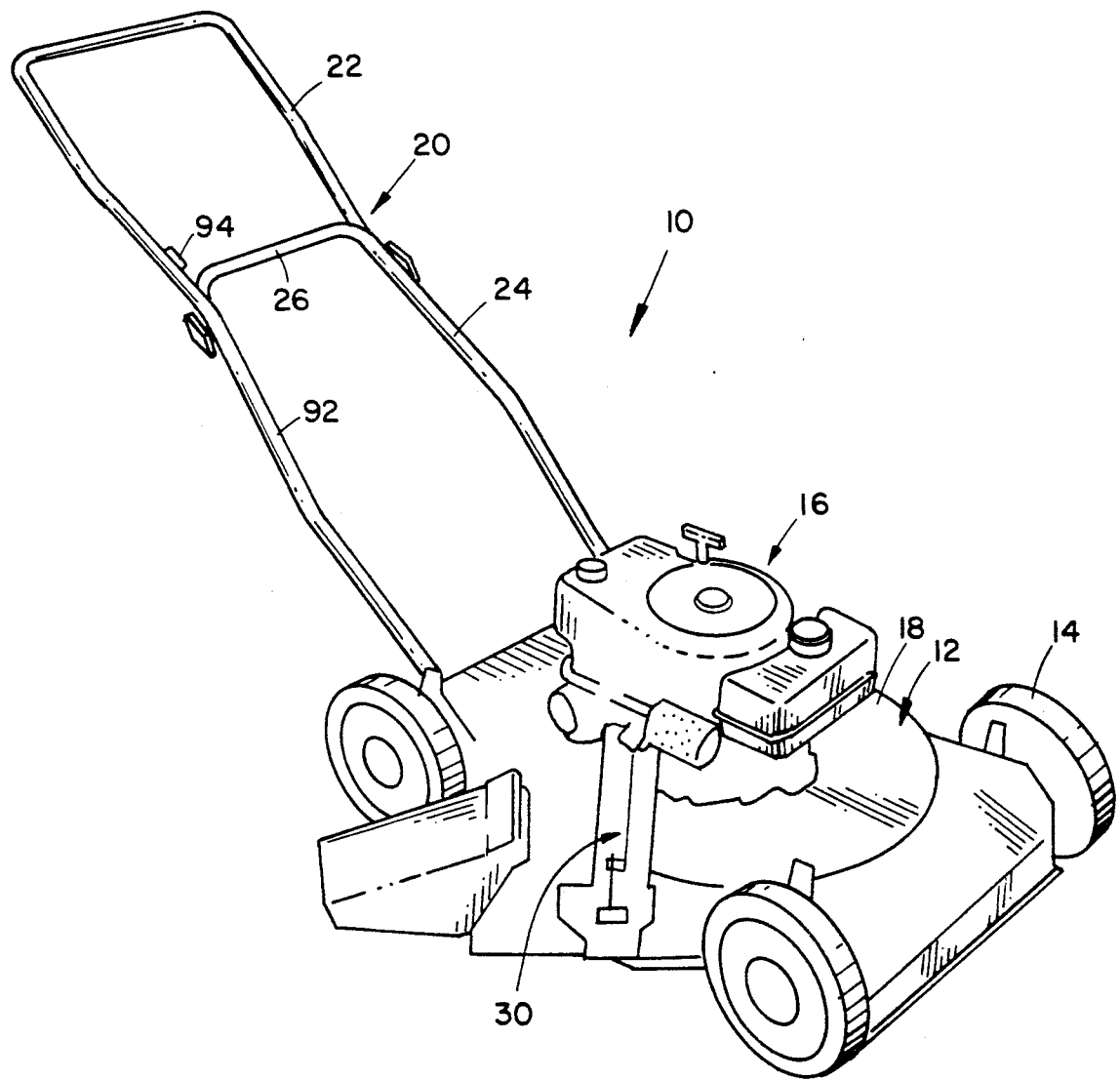
FIG. 1 is a top and front perspective view of a power lawn mower having an edging and trimming means embodying the present invention thereon.

Shown in FIG. 1 is a power mower 10 of the push type. The power mower 10 includes a main housing 12 having wheels 14 thereon and an internal combustion engine 16 mounted on a top surface 18 thereof. A handle 20 is connected to the main housing and is used to guide and propel the mower. The handle 20 is divided into two portions, a top portion 22 and a lower portion 24, with a crossbar 26 located at the junction of these two handle portions. The mower 10 includes the usual cutting blade located beneath the main housing and driven by the engine in the usual manner.

As discussed above, it is often desirable to conduct a trimming operation simultaneously with a cutting operation. Therefore, the device embodying the present invention is used in conjunction with the power mower 10. The edging and trimming means of the present invention is generally indicated in FIG. 1 at 30. The means 30 is driven by the engine 16 and deploys a string that is used to trim grass and the like in the manner of a WEED EATER or the like.

Figure 2:
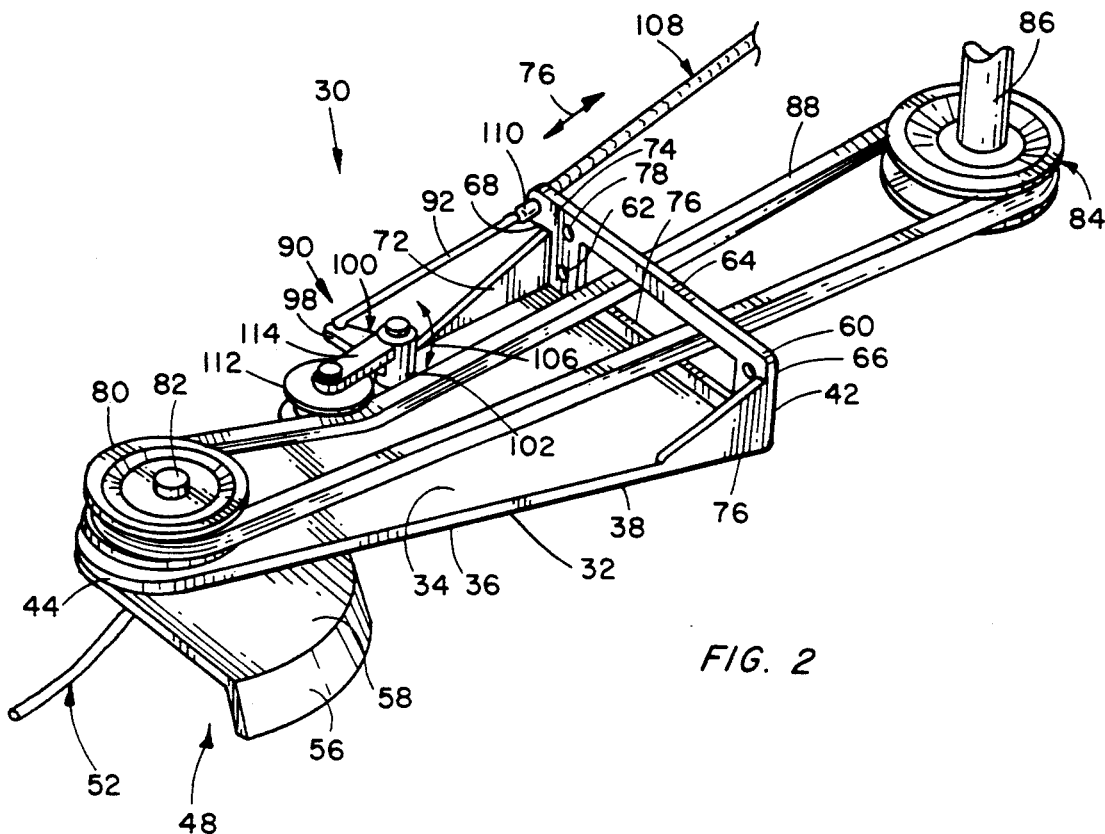
FIG. 2 is a perspective view of an edging and trimming mechanism embodying the present invention.
Figure 3:
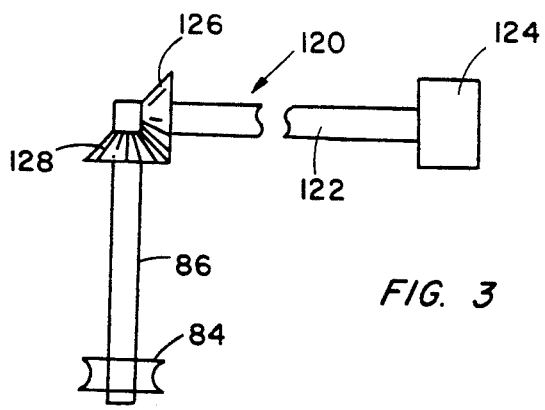
FIG. 3 is a schematic illustrating a mechanism used to transfer power from the motor of the lawn mower to the edging and trimming mechanism.

The edging and trimming means 30 is best shown in FIGS. 2 and 3. The means 30 includes a bracket 32 having a top surface 34, a bottom surface 36, sides 38, a proximal end 42 that is attached to the main housing 18 and a distal end 44. The means 30 further includes a string deploying mechanism 48 mounted on the bracket distal end and having a frusto-conical housing 50 in which a source of string 52 is located. The housing 50 includes a conical sidewall 56 and a top wall 58, with the top wall being located subadjacent to the bracket bottom surface 36. String 52 is deployed from the housing in the manner common to such trimming devices.

The bracket 32 is monolithic for ease of manufacture, and also includes a mounting base 60 on the proximal end 42. The mounting base includes a bottom edge 62 connected to the bracket, a top edge 64 spaced above the bracket top surface 34, and two side edges 66 and 68 connecting the top edge to the bottom edge. Two wings 70 and 72 connect the bracket side edges to the mounting base side edges. A cable mounting projection 74 extends sideways from mounting base side edge 68 for a purpose that will be understood from the following discussion.

A rectangular elongate slot 76 is defined through the mounting base, and two fastener receiving holes 78 are defined through the mounting base adjacent to each end of the slot 76.

A driven pulley 80 is mounted on a shaft 82 on the distal end of the bracket, and a driving pulley 84 is mounted on a drive shaft 86. The drive shaft 86 is connected to the mower engine to be rotatably driven thereby, with the driving pulley 84 being rotated by the shaft 86. A drive belt 88 is engaged with both the driven pulley 80 and the driving pulley 84 to rotate the driven pulley 80 in association with the driving pulley 84. As the driven pulley rotates, the string deploying mechanism of the device 48 is operated to deploy string 52 and perform the trimming and cutting functions associated with such string. The drive belt 88 extends through the elongate slot 76 and fasteners (not shown) extend through the fastener receiving holes 78 and attach the mounting base to the main housing 12.

In the event that the trimming operation is not to be carried out, the means 30 includes a mechanism to disengage the driven pulley from the driving pulley. This mechanism includes a clutch 90. The clutch includes a cable 92 having one end thereof attached to a handle 94 fixed to the mower handle 20 to be moved longitudinally as indicated by the double-headed arrow 96. Another end of the clutch cable is connected to one leg 98 of a bell crank lever 100. The bell crank lever 100 includes a cylindrical tubular body 102 mounted on a shaft 104 to pivot about that shaft as indicated by the double-headed arrow 106 in response to the movement of the clutch cable. The clutch cable is located in a shield 108 that is mounted on the projection 74 by a boss 110. A pulley 112 is mounted on a second leg 114 of the bell crank lever to move toward and away from the drive belt 88 in response to movement of the clutch cable as translated into rotary motion by the bell crank lever.

When the bell crank lever is in the position shown in FIG. 2, the pulley 112 forces the drive belt against the pulleys 80 and 84 to couple that drive belt to those pulleys. Thus, rotation of the driving pulley 84 is transmitted to the driven pulley 80 via the belt 88. This rotation operates the string deploying device 48. If the user wishes to discontinue use of the string deploying device, he simply operates the handle 94 to move the pulley 112 away from engagement with the belt 88. This decouples the driving pulley 84 from the driven pulley 80.

As best shown in FIG. 3, the drive shaft 86 is coupled to the motor 16 by a mechanism 120. The mechanism 120 includes a shaft 122 having a power take off mechanism 124 on one end thereof in engagement with the mower engine, and a bevel gear 126 on the other end thereof. The power take off mechanism includes gears that are engaged with cooperating gears in the engine whereby rotation of a shaft in the engine is translated into rotation of the shaft 122 about the longitudinal centerline of that shaft 122. The bevel gear 126 is engaged with a bevel gear 128 fixed to the shaft 86. Therefore, rotation of the shaft 122 is translated into rotation of the shaft 86 to which drive pulley 84 is fixed.

An alternative form of the edging and trimming means is shown in FIGS. 4-8 as means 30'. The means 30' is used in conjunction with an electrically powered mower 10' having a main housing 18' on which a motor M is mounted and which rides on wheels W. However, the means 30' can be used in conjunction with the mower shown in FIG. 1 as well.

The means 30' includes a bracket 150 having a top surface 152, a bottom surface 154, sides 156 and 158, a proximal end 160 and a distal end 162. A mounting base 164 is positioned on the bracket proximal end to attach the bracket to the main housing of the mower. The mounting base includes a bottom edge 166 attached to the proximal end of the bracket, a top edge 168 spaced above the bracket top surface 152, and side edges 170 and 172. Two wing-like connecting elements 174 and 176 connect the base side edges to the bracket side edges. A plurality of fastener receiving holes 178 are defined through the mounting base. The means 30' includes a motor 180 mounted on the bracket 150 and connected to a string deploying device 48' that deploys string 52 in the manner of such devices. The motor is operated by an on/off button 182 or can be remotely controlled.

Figure 4:
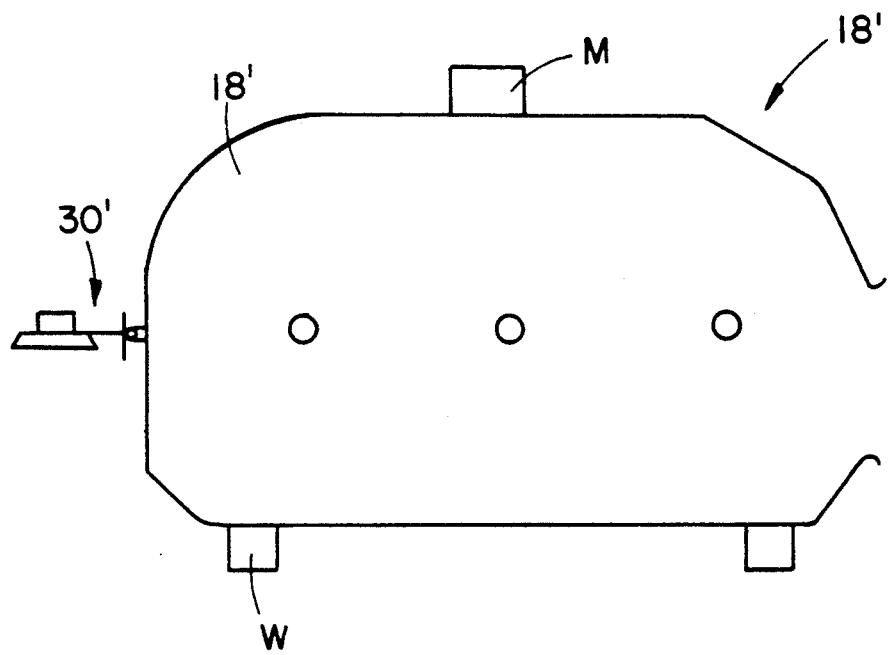
FIG. 4 is an end elevational view of an electric powered lawn mower using the edging and trimming device of the present invention.
Figure 5:
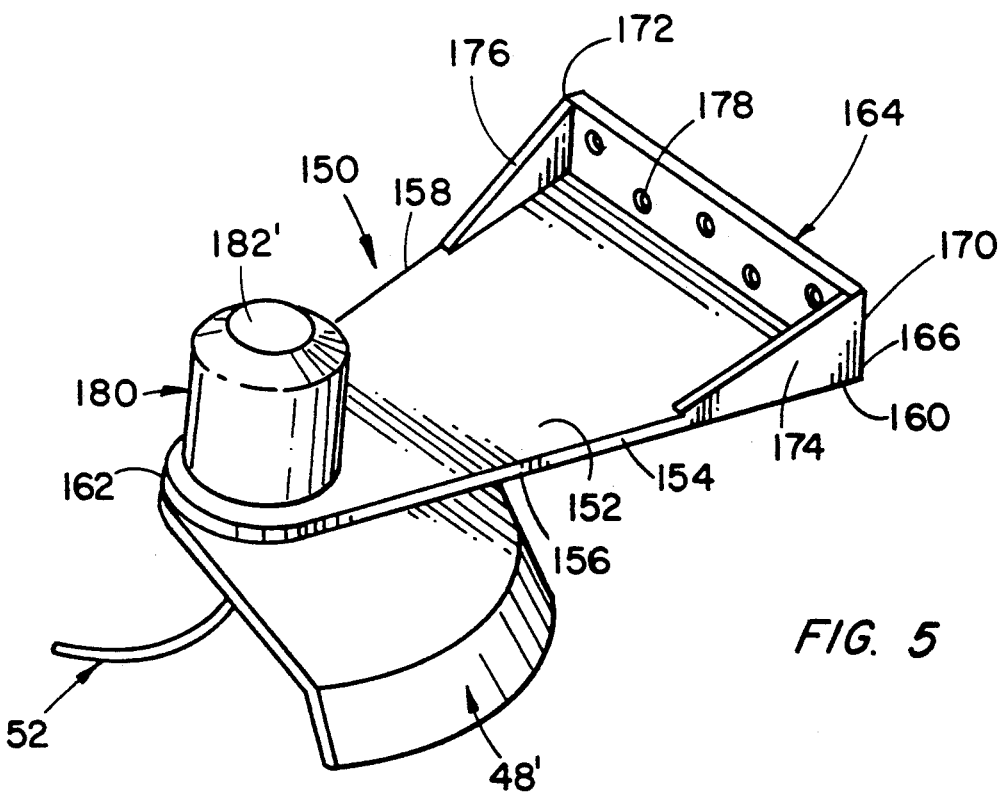
FIG. 5 is a perspective view of an edging and trimming mechanism used in conjunction with the electric powered lawn mower indicated in FIG. 4.
Figure 8:
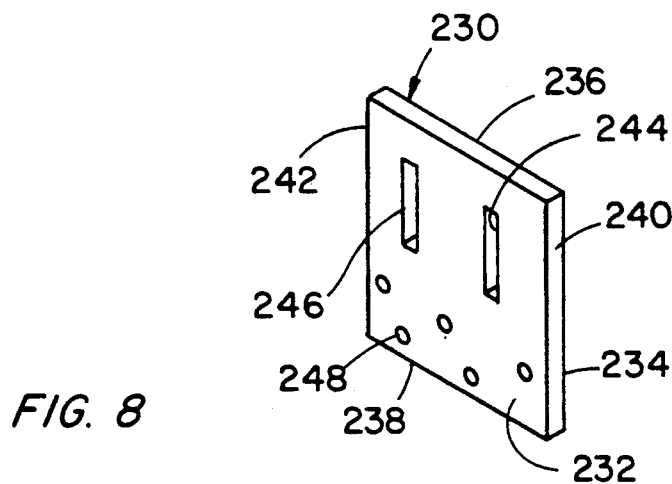
FIG. 8 is a perspective view of a plate used to mount the edging and trimming mechanism on the power mower housing.
Figure 6:
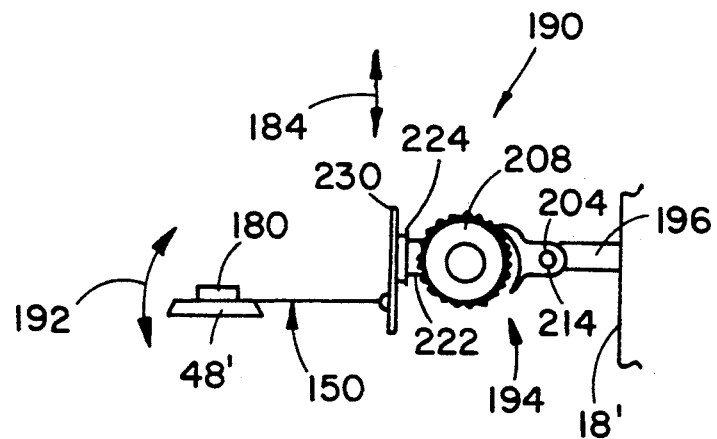
FIG. 6 is a schematic illustrating a mounting mechanism for mounting the edging and trimming mechanism shown in FIG. 5 on the mower shown in FIG. 4.

As best shown in FIGS. 4 and 6, the means 30' is connected to the mower main housing to be adjusted up or down as indicated in FIG. 6 by the double-headed arrow 184 to adjust the height of the means with respect to the ground over which the mower is moving. The means 30' can also be moved out of the way if suitable. This feature is achieved by a bracket mounting means 190 that permits the bracket 150 to move up or down as indicated in FIG. 6 by the double-headed arrow 192.

The bracket mounting means 190 includes a ratchet brace 194 that includes a first arm 196 mounted at one end thereof to the main housing of the mower, and having a ratchet element 198 on the other end thereof. The ratchet element includes two pointed ends 200 and 202 with a concave surface 203 therebetween. The surface 203 faces away from the main housing 18'. The ratchet element further includes a pivot pin 204 located between the two ends thereof.

A second arm 206 has one end thereof pivotally attached to the pivot pin 204 and has a gear element 208 rotatably mounted on the other end thereof by an axle 210. The gear element 208 includes a plurality of gear teeth, such as gear tooth 212, each of which is shaped and positioned to engage the pointed ends of the ratchet to prevent rotation of the gear element. A lock element 214 is also included to prevent the ratchet from accidentally separating from the gear teeth once that ratchet is engaged with the gear teeth. The lock is movable so the ratchet can be intentionally separated from the gear teeth when desired. The lock includes a stop element 216 hingeably connected to the arm 206 and which is moved into the position shown in FIG. 7 to block movement of the arm 206 with respect to the arm 196. A bolt 220 is mounted on the arm 206 and extends through a bolt receiving hole defined in the stop element when that element is in the FIG. 7 position.

Figure 7:
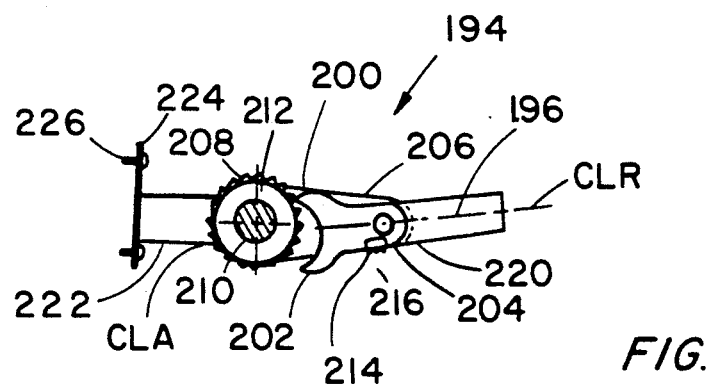
FIG. 7 is a ratchet brace mechanism used to connect the edging and trimming mechanism to the power mower.

The ratchet mechanism 194 moves between a locked position shown in FIG. 7 with the pointed end 200 engaged with one of the gear teeth 212 and an unlocked position with the gear element and the ratchet being disengaged from each other. The ratchet arm 196 includes a longitudinal centerline CLR and the arm 206 includes a longitudinal centerline CLA. In the locked position the centerline CLR is nearly aligned with the centerline CLA as shown in FIG. 7. In the unlocked position, the centerlines CLA and CLR define an angle of at least twenty degrees with respect to each other.

The ratchet brace includes a third arm 222 attached at one end thereof to the axle 210 and has a mounting plate 224 on the other end thereof. A plurality of bolts, such as bolt 226, are mounted on the plate 224 to extend away from the gear element 208.

An intermediate plate 230 is attached to the plate 224 by the fastener bolts 226. The intermediate plate 230 includes a front surface 232, a rear surface 234, a top edge 236, a bottom edge 238 and side edges 240 and 242. Two elongate slots 244 and 246 are defined through the plate 230, and a plurality of fastener receiving holes 248 are defined through the plate between the elongate slots and the bottom edge 238.

The plate 224 is attached to the intermediate plate by inserting the fasteners 226 through the slots 244 and 246 and adjusting the height of the plate 224 with respect to the ground over which the mower 10' is moving. Appropriate nuts are then placed on the bolts 226 and the plate 224 is attached to the plate 230. Further fasteners are inserted through the bracket holes 178 and through the plate holes 248 and appropriate nuts are attached to attach the bracket 150 to the intermediate plate. This attaches the bracket to the mower main housing. The angle of the device 48' with respect to the ground is set by unlocking the lock 214, and operating the ratchet mechanism to move the device 48' as indicated in FIG. 6 by the arrow 192. Once the proper angular setting is achieved, the lock 214 is set.

A device embodying the present invention can be used on both a push mower and a riding mower, with the device being mounted on the deck of the riding mower.

Figure 9:
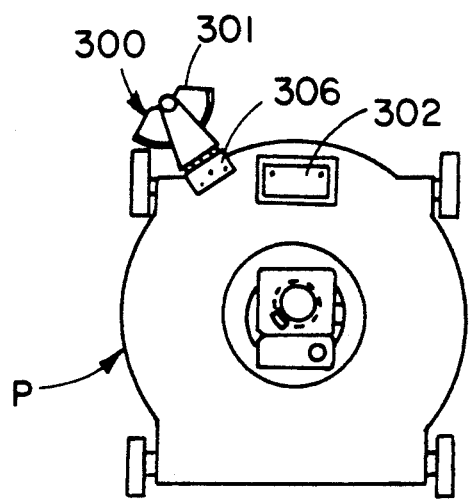
FIG. 9 is a top plan view of a push mower deck with another form of the device mounted thereon.
Figure 10:
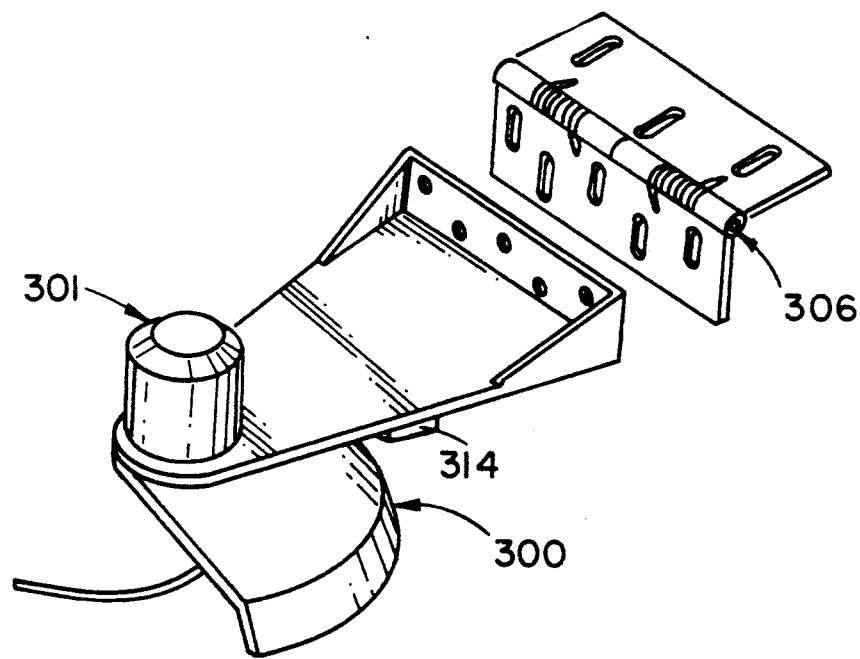
FIG. 10 is an exploded perspective view of the second form of the invention.

Shown in FIG. 9 is a form of the device used on a push mower p. The device 300 includes an electric motor 301 that is powered by a rechargeable battery 302 mounted on the mower by a battery mount 304 having a strap 306 so the battery can be removed if suitable.

The device 300 is mounted on the push mower by a hinged bracket 306 in a location that makes it possible to trim a side that is already established as the trim side.

The device 300 is powered by means of an electric circuit 310 shown in FIG. 12 to include an on/off switch 312 that is located on the handle of the mower or on the dashboard of a riding mower or the like that connects the device 300 to the battery 302 when closed. In order to ensure that the device 300 cannot be operated when it is in a stored configuration, the circuit 310 includes a tilt switch 314. This tilt switch can be a mercury switch, such as mercury switch 314M shown in FIG. 13, or switch 314M' shown in FIG. 14, or a microswitch or the like, and acts as an AND switch. This switch must be closed in order for the on/off switch to activate the device 300, and is set to be open if the device 300 is in the stored configuration. The switch 314M is closed when mercury drop 316 is positioned to bridge contacts 318 and 320, and will be in such position only when the device 300 is in a proper orientation to perform a desired cutting operation. The switch 314M' closes when mercury drop 316' bridges contacts 318' and 320' and will open when that mercury drop is in the position shown in FIG. 14.

It is understood that while certain forms of the present invention have been illustrated and described herein, it is not to be limited to the specific forms or arrangements of parts described and shown.

I claim:

1. In combination with a power lawn mower having an internal combustion engine motor, a main housing, and a handle connected to the main housing, the improvement in combination therewith comprising:

edging and trimming means for edging and trimming grass, said edging and trimming means including (1) a bracket having a proximal end, a distal end, a planar top surface and a bottom surface, (2) a mounting base on said bracket proximal end, said mounting base having a bottom edge connected to said bracket proximal end, a top edge spaced above said bracket top surface, and two side edges connecting said mounting base bottom edge to said mounting base top edge, said mounting bracket having a width dimension adjacent to said proximal end defined between said mounting base side edges and extending upwardly above said bracket top surface at a right angle to sad bracket top surface and having an elongate slot defined therethrough and extending widthwise of said bracket, a plurality of fastener receiving holes defined through said mounting base between said slot and each of said two side edges, a mounting projection on one of said two side edges adjacent to one of said fastener receiving holes, (3) two wing-like connecting elements, each connecting one of said mounting base side edges to said bracket,
(4) a cable mounting element fixed to said mounting projection,
(5) a driven pulley mounted on said bracket distal end to rotate in a plane that is parallel to said bracket top surface,
(6) a drive shaft driving mechanism connected to the lawn mower motor to be driven thereby,
(7) a drive shaft connected to said drive shaft driving mechanism, said drive shaft being located adjacent to one side of the lawn mower,
(8) a driving pulley fixed to said drive shaft for rotation therewith,
(9) a drive belt wrapped around said driving pulley and around said driven pulley, said drive belt extending through said mounting base elongate slot,
(10) fasteners mounting said mounting base to the lawn mower main housing,
(11) a clutch mechanism for engaging said drive belt with said driving pulley and with said driven pulley for driving said driven pulley, said clutch mechanism including
 (a) a clutch handle movably mounted on the lawn mower handle,
 (b) a clutch cable connected at one end thereof to said clutch handle to be moved therewith, said clutch cable being mounted on said mounting base cable mounting bracket,
 (c) a mounting shaft mounted on said bracket top surface,
 (d) a bell crank pivotally mounted on said bracket top surface,
 (e) a pulley connected to a second leg of said bell crank to move toward and away from said drive belt when said clutch handle is moved,
(12) a string housing mounted on said bracket bottom surface adjacent to said bracket distal end, and
(13) a string feeding and storing means connected to said driven pulley.

2. The edging and trimming means defined in claim 1 wherein said drive shaft driving mechanism includes a first shaft connected at one end thereof to the lawn mower motor and having a bevel gear on another end thereof, said drive shaft having a second bevel gear on one end thereof in engagement with said first bevel gear.

3. In combination with a power lawn mower having an electric motor and a main housing, the improvement in combination therewith comprising:
edging and trimming means for edging and trimming grass, said edging and trimming means including
 (1) a bracket having a proximal end, a distal end, a planar top surface and a bottom surface,
 (2) a mounting base on said bracket proximal end, said mounting base having a bottom edge connected to said bracket proximal end, a top edge spaced above said bracket top surface, and two side edges connecting said mounting base bottom edge to said mounting base top edge, said mounting bracket having a width dimension adjacent to said proximal end defined between said mounting base side edges and extending upwardly above said bracket top surface at a right angle to said bracket top surface and having an elongate slot defined therethrough and extending widthwise of said bracket, a plurality of fastener receiving holes defined through said mounting base between said slot and each of said two side edges, a mounting projection on ne of said two side edges adjacent to one of said fastener receiving holes,
 (3) two wing-like connecting elements, each connecting one of said mounting base side edges to said bracket,
 (4) a second electric motor mounted on said bracket adjacent to said bracket distal end,
 (5) a string housing mounted on said bracket bottom surface adjacent to said bracket distal end,
 (6) a string storing and feeding means connected to said second electric motor, and
 (7) bracket mounting means movably mounting said bracket to the lawn mower main housing, said bracket mounting means including
  (a) a ratchet arm mounted at one end thereof to the lawn mower main housing, said ratchet arm having a longitudinal centerline,
  (b) a ratchet element on another end of said ratchet arm, said ratchet element including two pointed ends and a concave surface facing away from said main housing,
  (c) a pivot pin attached to said ratchet arm between said ratchet arm one end and said another end,
  (d) a second arm pivotally attached at one end thereof to said ratchet arm pivot pin, said second arm having a longitudinal centerline and moving between a locking position relative to said ratchet arm with said second arm longitudinal centerline nearly in alignment with said ratchet arm longitudinal centerline and an unlocked position with said second arm longitudinal centerline at an angle of greater than twenty degrees with respect to said ratchet arm longitudinal centerline,
  (e) an axle attached at another end of said second arm,
  (f) a gear element rotatably mounted on said axle, said gear element including a plurality of gear teeth sized and located to engage one of said ratchet element pointed ends when said second arm is in said locking position,
  (g) a third arm attached at one end thereof to said axle,
  (h) a mounting plate attached to another end of said third arm and including a plurality of fasteners mounted thereon,
  (i) an intermediate plate having two elongate slots defined therethrough, and a plurality of fastener receiving holes defined therethrough,
  (j) said mounting plate fasteners being attached to said intermediate plate adjacent to said intermediate plate elongate slots,
  (k) said bracket mounting base being attached to said intermediate plate by said bracket fasteners engaging said intermediate plate adjacent to said intermediate plate fastener receiving holes.

4. The edging and trimming means defined in claim 3 wherein said ratchet element and said gear element further include a locking element mounted on said third arm to engage said ratchet arm when in a locking position.

* * * * *